United States Patent [19]

Frisch et al.

[11] Patent Number: 4,873,634
[45] Date of Patent: Oct. 10, 1989

[54] SPELLING ASSISTANCE METHOD FOR COMPOUND WORDS

[75] Inventors: Rudolf A. Frisch, Teaneck, N.J.; Antonio Zamora, Chevy Chase, Md.

[73] Assignee: International Business Machines Corporation, Armonk, N.Y.

[21] Appl. No.: 30,793

[22] Filed: Mar. 27, 1987

[51] Int. Cl.[4] .......................................... G06F 15/40
[52] U.S. Cl. .................................... 364/419; 364/900; 364/943.41
[58] Field of Search ... 364/200 MS File, 900 MS File, 364/419

[56] References Cited

U.S. PATENT DOCUMENTS

| | | | |
|---|---|---|---|
| 4,158,236 | 6/1979 | Levy | 364/900 |
| 4,329,561 | 5/1982 | Convis et al. | |
| 4,342,085 | 7/1982 | Glickman et al. | 364/300 |
| 4,355,371 | 10/1982 | Convis et al. | |
| 4,453,217 | 6/1984 | Boivie | 364/200 |
| 4,471,459 | 9/1984 | Dickinson et al. | 364/900 |
| 4,611,995 | 9/1986 | Sado | 364/419 |
| 4,672,571 | 6/1987 | Bass et al. | 364/900 |
| 4,701,851 | 10/1987 | Bass et al. | 364/419 |
| 4,703,425 | 10/1987 | Muraki | 364/419 |

OTHER PUBLICATIONS

A. Zamora, "Control of Spelling Errors in Large Data Bases", *The Information Age in Perspective, Proceedings of the ASIS Annual Meeting*, vol. 15, pp. 364–367, 1978.
A. Zamora, "Automatic Detection and Correction of Spelling Errors in a Large Data Base", *Journal of the American Society for Information Science*, 31(1), pp. 51–57, 1980.
J. J. Pollock & A. Zamora, "Automatic Spelling Correction in Scientific and Scholarly Text", *Communications of the ACM*, 27(4), pp. 358–368, 1984.
J. L. Peterson, "Computer Programs for Detecting and Correcting Spelling Errors", *Communications of the ACM*, 23(12), pp. 676–697, 1980.
R. Lowarance & R. A. Wagner, "An Extension of the String-to-String Correction Problem", *Journal of the ACM*, 23(12), pp. 676–687, 1980.
H. Jappinen & M. Ylilammi, "Associative Model of Morphological Analysis: An Empirical Inquiry", *Computational Linguistics*, 12(4), pp. 257–727, 1986.
R. P. Botha, *Morphological Mechanisms; Lexicalist Analysis of Synthetic Compounding*, Language and Communication Library, vol. 7, Pergamon Press, Oxford, 1984, ISBN 0-08-031820-7.
T. N. Turba, "Checking for Spelling and Typographical Errors in Computer-Based Text", Sperry Univac Language Systems, pp. 51–60.

*Primary Examiner*—Gareth D. Shaw
*Assistant Examiner*—John G. Mills
*Attorney, Agent, or Firm*—John E. Hoel

[57] ABSTRACT

Correctly spelled compound words are provided as candidates to replace a misspelled compound word in many natural languages such as Dutch, Danish, German, Icelandic, Norwegian, Swedish, Swiss German, etc. The basic technique consists of looking up words in a dictionary by the association of component flags with each possible constituent word within the misspelled compound word as well as with the possible replacement candidates for each letter string between these possible constituent words, and by the application of powerful tree-scanning techniques that isolate the possible components of a compound word and determine their correctness in isolation and association of each other.

4 Claims, 3 Drawing Sheets

FLOW DIAGRAM FOR COMPOUND WORD SPELLING ASSISTANCE

FLOW DIAGRAM FOR COMPOUND WORD SPELLING ASSISTANCE

SPELLING ASSISTANCE METHOD FOR COMPOUND WORDS

BACKGROUND OF THE INVENTION

1. Technical Field

The invention disclosed broadly relates to data processing techniques and more particularly relates to an improved method for providing spelling assistance for compound words.

2. Related Applications

V. R. Bass, et al., "Compound Word Spelling Verification," Ser. No. 664,183, filed Oct. 24, 1984, assigned to IBM Corporation, now U.S. Pat. No. 4,701,851.

V. R. Bass, et al., "Compound Word Suitability for Spelling Verification," Ser. No. 664,184, filed Oct. 24, 1984, assigned to IBM Corporation, now U.S. Pat. No. 4,672,571.

R. A. Frisch and A. Zamora, "Method for Verifying Spelling of Compound Words," Ser. No. 025,041, filed Mar. 12, 1987, assigned to IBM Corporation, now U.S. Pat. No. 4,777,617.

The disclosure of each of the above cited patent applications is incorporated herein by reference to serve as a background for the invention disclosed herein.

BACKGROUND ART

Text processing word processing systems have been developed for both stand-alone applications and distributed processing applications. The terms text processing and word processing will be used interchangeably herein to refer to data processing systems primarily used for the creation, editing, communication, and/or printing of alphanumeric character strings composing written text. A particular distributed processing system for word processing is disclosed in the copending U.S. patent application Ser. No. 781,862 filed Sept. 30, 1985 entitled "Multilingual Processing for Screen Image Build and Command Decode in a Word Processor, with Full Command, Message and Help Support," by K. W. Borgendale, et al. The figures and specification of the Borgendale, et al. patent application are incorporated herein by reference, as an example of a host system within which the subject invention herein can be applied.

Spelling verification and assistance is now considered an essential component of word processing packages even for personal computers. Spelling verification is the process of highlighting the misspellings of a document, whereas spelling assistance involves displaying a set of correctly spelled words which could potentially replace a misspelling. The level of support provided by these programs depends on the capabilities of the computer and on the sophistication of the software.

In general, all spelling verification programs work by referencing a dictionary of correctly spelled words. A. Zamora, "Control of Spelling Errors in Large Data Bases," *The Information Age in Perspective, Proceedings of the ASIS Annual Meeting*, Vol. 15, pp. 364-367, 1978; A. Zamora, "Automatic Detection and Correction of Spelling Errors in a Large Data Base," *Journal of the American Society for Information Science*, 31(1), pp. 51-57, 1980; J. J. Pollock and A. Zamora, "Automatic Spelling Correction in Scientific and Scholarly Text," *Communications of the ACM*, 27(4), pp. 358-368, 1984; and J. L. Peterson, "Computer Programs for Detecting and Correcting Spelling Errors," *Communications of the ACM*, 23(12), pp. 676-687, 1980. Interactive spelling verification can be supported by encoding the dictionaries as hash codes to achieve the necessary response time, but such dictionaries cannot be used to support spelling aid because the words cannot be reconstructed from the hash codes. The latest generation of software uses compressed dictionaries which take into consideration the frequency of occurrence of the words to achieve the desired speed and to have the reversibility necessary to supply words from the dictionary as spelling aid candidates. Note the above referenced J. L. Peterson article and D. B. Convis, D. Glickman and W. S. Rosenbaum, "Instantaneous Alpha Content Prescan Method for Automatic Spelling Error Correction," U.S. Pat. No. 4,355,371; and D. B. Convis, D. Glickman and W. S. Rosenbaum, "Alpha Content Match Prescan Method for Automatic Spelling Error Correction," U.S. Pat. No. 4,328,561.

The basic technique used for providing spelling aid candidates is to scan a word list (or part thereof), associate a figure of merit with each word in the list and present a number of words with the best figures of merit as replacement candidates. The figures of merit can be obtained by using string similarity measures which determine how many error operations are required to change one word to another. Note the two previously mentioned U.S. patents and the following reference: R. Lowrance and R. A. Wagner, "An Extension of the String-to-String Correction Problem," *Journal of the ACM*, 22(2), pp. 177-183, 1975.

Spelling support technology has not evolved for all languages with the same ease as it has for English. The linguistic simplicity of English as well as strong economic marketing factors are responsible for the rapid maturation of the English technology. The spelling support technology for English can be used for other languages with few changes, but there are some languages such as Finnish, which are hard to handle linguistically and cannot use the same technology. Note H. Jappinen and M. Ylilammi, "Associative Model of Morphological Analysis: An Empirical Inquiry," *Computational Linguistics*, 12(4), pp. 257-272, 1986. There are also languages like German, which can use most of the technology, but require special compound-word handling.

Because word agglutination is not a very active word-formation mechanism in English, it is possible to include a very large percentage of compound words into a computerized word list. This is practically impossible for other Germanic languages due to the exceedingly large combinatorial compounding possibilities which they allow. If one were to create a large list of compound words, e.g., for German, this would not only require an enormous amount of storage, but it still would not guarantee that scanning the list would result in the retrieval of suitable candidates for misspelled compound words or that correctly spelled compound words would match against it.

Compound words are a common occurrence in Germanic languages. Germanic languages are generally divided into North Germanic and West Germanic types. The main languages of the former include Danish, Icelandic, Norwegian and Swedish, whereas the latter include Afrikaans, Dutch, English and German.

Compound word concepts can be formed through: (A) a simple word sequence such as "salt water," "sugar cube," "snow removal equipment repair facility;" (B) a sequence of words joined by required hyphens, e.g., "mother-in-law," "able-bodied;" (C) a sequence of words directly agglutinated to each other, such as "homemaker," "housewife," (German) "Gesundheitsamt." It is important to notice that a component of a compound word formed by mechanisms B or C might not be usable as a word by itself, e.g., "bodied" in B, or "Gesundheits" in C. The morphological mechanism of word compounding in English has been reviewed by R. P. Botha, *Morphological Mechanisms; Lexicalist Analysis of Synthetic Compounding*, Language and Communication Library, Vol. 7, Pergamon Press, Oxford, 1984; ISBN 0-08-031820-7.

In this text, the concept of "compound word" will be restricted to compound words formed by mechanism C above, since this disclosure deals only with the problem of providing spelling assistance for misspelled compound words that do not have internal punctuation delimiters. It should be noted also, that although the approach presented here is generally applicable to the Germanic languages, it is not limited to them.

OBJECTS OF THE INVENTION

It is therefore an object of the invention to provide an improved method for assisting a user in spelling compound words.

It is another object of the invention to provide an improved method for generating correctly spelled example compound words in response to the inputting by the user of a misspelled compound word.

It is yet a further object of the invention to provide an improved method to analyze and spell correctly compound words through the repetitive application of a systematic and efficient word parsing algorithm and outputting suitable candidate compound words similar to the misspelled inputted compound word.

SUMMARY OF THE INVENTION

These and other objects, features and advantages of the invention are accomplished by the spelling assistance method for compound words disclosed herein. The invention is a technique to provide correctly spelled candidates for misspelled compound words ("Spelling Aid"). The technique consists of identifying substrings of the compound word whose components satisfy specific positional characteristics and then providing correctly spelled candidates for any unrecognized substrings occurring before, between, or after the previously identified substrings. As a final step, these candidate words are combined with the recognized substrings to obtain valid compound words where every component has the positional characteristic required by its position in the compound word. Morphological characteristics of the language are considered.

The fundamental aspects of the invention are the analysis of the incorrectly spelled compound word through a multiple application of a systematic and efficient word parsing algorithm that takes into account the positional characteristics of each of its components and the use of spelling aid for simple words to obtain components with valid positional characteristics.

BRIEF DESCRIPTION OF THE DRAWINGS

These and other objects, features and advantages of the invention will be more fully appreciated with reference to the accompanying figures.

DESCRIPTION OF THE BEST MODE FOR CARRYING OUT THE INVENTION

Earlier work on compound word spelling verification provided the basic characteristics of the dictionary which were adapted for compound word spelling aid. The dictionary consists, in essence, of a list of words each of which is associated with codes that indicate whether the word can be ( 1) stand-alone, ( 2) a front component, ( 3) a middle component, or ( 4) a back component of a compound word. Since these four attributes are independent, any of 15 possible codes can be associated with a dictionary word to indicate its compounding characteristics. In addition to these codes, a different set of codes can be used to specify language-dependent transformations.

The consequence of this coding scheme is that the dictionary will contain some words which can only be prefixes or suffixes but not stand-alone words. Such words cannot be presented as aid candidates outside of an appropriate compound-word context. Examples of such words are the prefix "un" (e.g., "unknown"), the suffix "ness" ("brightness") and the German infix "ge" ("aufgerufen").

Words that are altered when combined in particular sequences are entered in the dictionary in their different forms. Such words are created by the occurrence of "fugen-characters" (binding morphemes) or letter sequences which are inserted at the junction of some word agglutinations. For example, in German the word "Achtung" which can be a stand-alone or back component is transformed to the word "Achtungs" when it is used as a front or middle component. The inclusion in the dictionary of words with these binding morphemes ("s" in this case) improves both the reliability of the decompounding process and its speed.

Decomposition of Compound Words:

The identification of the components of a compound word is the most important step for word verification and for providing spelling aid. Word decomposition starts by looking in the dictionary for words which are initial substrings of the compound word. As each word is found, its compounding attributes are checked to make sure that it can be a front component. If not, the word is rejected as a possible component and the search through the dictionary continues. Once all the possible initial components have been identified, the remaining portion of the compound word is subjected recursively to the same substring-matching procedure against the dictionary, but the compounding attributes must be those of a middle or back component (the latter only if the remaining portion of the compound matches exactly against a word in the dictionary).

Many ambiguous cases ("sun-spots," "suns-pots") will be resolved by the decomposition process on the basis of the compounding attributes found in the dictionary, but some words may have more than one set of acceptable components. Since the process is recursive and requires constant access to the dictionary, the computer time required to decompound a word depends on the degree of branching of the compound word. The degree of branching is proportional to the length of the compound word and to the length of the components in the dictionary. The degree of branching, and execution time, can be reduced by eliminating from the dictionary short words which can be front or middle components and which are frequently found as substrings in many words. Removal of these words from the dictionary is practical for those short words which occur only in combination with a relatively small number of other words; it is accomplished by adding to the dictionary all compound words containing the component.

Juxtaposition is not the only mechanism employed to create compound words; as stated earlier, sometimes binding morphemes occur between the components. By including components with their binding morphemes as lexical entries, decomposition of compound words can be accomplished with the same mechanism. However, in addition to inserting characters, some Germanic languages elide characters at component interfaces during compounding. In general, decomposition of words formed by elision of characters is accomplished by language-specific procedures which are applied at component boundaries when the dictionary look-up fails to find adequate dictionary words. In some languages elisions are defined strictly by the characters before and after the interface (for example, in Norwegian and Swedish, if the component before the junction terminates in two equal consonants and the component after the junction starts with the same consonant, one of these is always elided during compounding). This also happens in German, for example, when the words "Schiff" and "Fahrt" are combined to form "Schiffahrt."

In some languages elisions have grammatical dependencies. For example, Afrikaans has an elision mechanism for word forms containing the binding morpheme "s" followed by another word starting with "s." Unlike German, some of these word forms can occur as standalone words when they happen to represent plurals. The decompounding algorithm can cope with such elisions if the appropriate codes are in the dictionary. Once the elision has been recognized, it is merely necessary to indicate that the remaining portion of the compound word starts at the last character of the preceding component and continue with the normal process.

The identification of the components of a compound word provides not only a way of verifying spelling, but also makes it possible to hyphenate properly. Generally, it is preferable to hyphenate at the boundary of two components, and if characters have been elided it is necessary to restore them. Thus, the word "Schiffahrt," when hyphenated, adds an extra "f," i.e., "Schiff-fahrt." The information derived from word decomposition provides the major break points for the word. These are supplemented with the internal hyphenation points available in the dictionary for each word component.

Description of the General Approach:

An early prototype for compound word spelling assistance investigated by the authors consisted of having the user identify the beginning and ending of the misspelled component of a compound word and then the computer system would provide replacement candidates as for any other isolated word. Upon selection of one of the candidates, the computer system replaced the misspelled component and constructed the correct compound word. The system was cumbersome because it had poor human factors.

The fully automatic version has the advantage of having the same human interface as the spelling aid mechanism for noncompound words. The spelling aid algorithm uses the decompounding algorithm because it needs to identify the components. It proceeds in three phases. First, the "unknown" component of a compound word is identified by locating components that precede or follow the unknown component. Then, spelling aid is invoked to retrieve a list of correctly spelled words which are most similar to the unknown component. Finally, plausible compound words are generated using the leading components, the candidate replacements from the spelling aid list, and the trailing components.

More specifically, the first phase starts by looking in the dictionary for words which are initial substrings of the compound word while checking the word attributes for consistency. The algorithm uses language-specific morphological transformations to take into consideration elision patterns at possible component junctions. However, whereas the decompounding algorithm terminates when unknown components are encountered, the aid algorithm goes further. It skips one character of the remaining portion of the compound word and attempts the substring-matching procedure against the dictionary. If this is not successful, another character is skipped and the remaining string is processed again until either a back component is found or there are no more characters to process.

The first phase, thus, isolates a single "unknown" component preceded and followed by leading and ending strings which consist of zero or more components. If the leading string has zero components, the unknown component is at the beginning of the compound words; if the trailing string has zero components, the unknown component is at the end of the compound; otherwise, it is embedded within the compound word.

The second phase uses the traditional spelling aid, for simple words with the unknown component as an argument. A list of spelling candidates and their corresponding compounding attributes is obtained from the dictionary. The third phase generates compound words that meet the constraints implied by the compounding flags, and the resulting compound words are then ranked against the input word using a string similarity measure. A list of compound words ranked according to this measure is presented to the user.

The Compound Word Spelling Assistance Algorithm:

This section provides details of the algorithm used to provide spelling assistance for compound words. Some language-specific features for German are included in this algorithm.

Step 1: Examine the input word (for which spelling aid has been requested) to find if word is correctly spelled. If it is, display message and exit.

Step 2: Invoke simple spelling aid for the input word, obtaining candidates and their figure of merit. If this figure of merit is within specified limits for at least one candidate (i.e., there is a very good "fit" between the candidate and the input word), display the candidates and exit.

Step 3: Check the length of the input word for (preset) upper and lower bound. If the length is outside the range, display simple spelling aid candidates if any; if there are none, display message. Exit.

Step 4: Change the first letter of the input word to upper case and all other letters to lower case. From this point forward this will be considered the "input word."

Step 5: Examine the input word (now with the first letter in upper case) to see if it is a valid compound word. If so, put the word into the candidate list and go to the last step.

Step 6: Examine the input word. If it is correctly spelled except for required elisions, make the required elisions, put the word into the candidate list and go to the last step.

Step 7: Examine the input word without its last letter. If it is correctly spelled, put the word into the candidate list and go to the last step.

Step 8: Examine the input word without its last letter. If it is correctly spelled except for required elisions, make the required elisions, put the word into the candidate list and go to the last step.

Step 9: Match the input word against the dictionary to obtain all possible initial strings containing one or more valid sequences of components (these are called "frontwords").

Step 10: Select a frontword obtained as a result of Step 9.

Step 11: Obtain all possible terminal strings containing one or more valid sequences of components (these are called "backwords"). This involves skipping characters until a valid verification is achieved on the remainder of the input string.

Step 12: Select the first backword, forming a frontword/backword pair.

Step 13: Invoke simple spelling aid for the characters delimited by the frontword/backword pair (this is the "unknown" component). The candidates obtained from spelling aid are called "aidwords."

Step 14: If the unknown word is shorter than a preset minimum length and both frontword and backword are not null, concatenate frontword and backword, obtain figure of merit and post to the candidate list. If either the frontword or the backword is null, go to Step 16. If the unknown word equals or exceeds the minimum length and if no aidwords are found, go to Step 16; otherwise go to the next step.

Step 15: Concatenate the frontword, each aidword and the backword, evaluate the figure of merit for each and post to the candidate list.

Step 16: If the unknown word already has an elision letter as its first letter (as defined in Step 17) go to Step 18.

Step 17: Examine the frontword/unknown word junction for the possibility of an elision. If this possibility exists, it is necessary to restore the elided letter and repeat Steps 13-16 for the modified unknown word. If this possibility does not exist, go to the next step.

Step 18: If there is another backword for this frontword, form a new frontword/backword pair and repeat Steps 13-18. Otherwise, go to the next step.

Step 19: If there is another frontword, repeat Steps 11-19 for this frontword. Otherwise, go to the next step.

Step 20: If no candidates have been found and if the first two characters of the input word are identical except for case, delete the second character of the input word and repeat Steps 5-20. (This is done only for the first two characters of the original word for which spelling assistance has been requested; if this has been done once, do not repeat.)

Step 21: Examine all candidates for required elisions and make them as required by the language.

Step 22: If no candidates are available from either simple spelling aid or compound spelling aid then display a message. Otherwise display candidates ranked by figure of merit.

Discussion of Results:

The spelling assistance algorithm depends on the performance of its subordinate procedures. It is affected in particular by the decompounding procedure, the spelling assistance procedure for simple words, and by the codes for compounding stored in the dictionary. With regard to the decompounding procedure, both Type-I errors (flagging a correctly spelled word) and Type-II errors (not flagging a misspelled word) have been observed, but the error rate is small compared with some of the other limitations inherent in the process.

For the hyphenation function, the results have been extremely satisfactory. The only limitation found was the possibility of multiple decomposition of the compound word (e.g., the German word "Staubecken" can be decomposed into "Stau+Becken" or "Staub+Ecken").

Whereas for compound words spelling verification and hyphenation are basically analytical procedures, spelling assistance deals with compound word synthesis; therefore, syntactic and semantic criteria need to be used to judge the suitability of the generated words. As can be expected, compound word spelling assistance has a lower efficiency of finding the "correct" replacement candidate than spelling assistance for simple words, but what is more important, in contrast to the latter, it can generate replacement candidates which are semantically meaningless (e.g., "church-goer" is meaningful but "kitchen-goer" is not).

The algorithm was tested against a sample of approximately 225 misspelled German compound words extracted from a large corpus of German test documents. Of these misspelled words, about 85% had two components, 14% had three components and 1% had four components. Analysis of the words generated as candidates showed that the results were very dependent on the efficiency of the spelling assistance for simple words (simple aid). If the "correct" candidate was not generated for the "unknown" component of the compound word, it was not possible to generate the correct compound word. In addition, meaningless compound words were generated when some of the candidates presented by the simple aid had the appropriate compounding attributes in the dictionary, but were inappropriate for the context. The results were quantified as follows: If simple aid provided a list with the "correct" candidate X times out of Y, then the compound spelling aid presented the correct candidate approximately as the square of that ratio (i.e., (X/Y)**2). The number of meaningless candidates was relatively large, although not intolerable for German in a word-processing environment.

Further examination of the output candidates also indicated that a significant proportion of the meaningless words had more components than the original word due to the occurrence of short character sequences common in the language which could also be compound word components (e.g., German "ges"). However, such candidates occurred generally at the end of the candidate list because they had worse figure of merit (less similarity to the input word).

The algorithm was modified based on these results. As a first step a limit was placed on the number of components in a replacement candidate, the number being a function of the length of the compound word. Additional constraints were imposed on the figure of merit required to generate a replacement candidate. Finally, the maximum number of candidates presented by the program was reduced. As a result of these improvements, the number of semantically meaningless candidates was reduced by over 20% without practically affecting the efficiency of the compound word spelling assistance function.

More Detailed Discussion of the Operation of the Invention

The invention is a technique to provide spelling aid for compound words in the languages in which these kinds of words are used. The technique for the basic case consists of the following four parts:
1. Analysis of the compound word for which spelling aid has been requested.
   (a) Find a valid front subword formed by noncompound words with admissible positional characteristics (also called "compound flags") using the parsing algorithm described in the references.
   (b) Find a valid back subword formed by noncompound words with admissible positional characteristics (also called "compound flags") using the parsing algorithm described in the references.
   (c) Obtain the subword formed by a letter string formed from letters between the front and the back substrings, also adding a front letter to this substring if the respective language possesses this characteristic.
2. Finding replacement candidates for the subword obtained in #1.c above, treating this subword as a simple word, considering and satisfying the positional characteristic required for this subword, evaluating these candidates for "goodness of fit" and selecting the best candidates according to morphological and phonetic criteria (see references).
3. Forming spelling aid candidates for the compound word by concatenation of the front subword obtained in #1.a, the simple word candidates obtained in #2 and the back subword obtained in #1.b.
4. Evaluating the "goodness of fit" for each candidate of #3 and selecting the best candidates.

Note: In particular, either the front subword of #1.a or the back subword of #2, but not both, might be a "null" word, i.e. the case where either no front substring or no back substring exists is covered by the above technique.

The parsing algorithm used for obtaining possible front and back subword is based on "pre-order" scanning of trees and is described in the copending patent application by R. A. Frisch and A. Zamora entitled "Method for Verifying the Spelling of Compound Words," filed March, 1987 and assigned to the IBM Corporation. The parsing algorithm is used repeatedly throughout the technique described above.

Consider for example, the English "installations for repair of snow removing equipment." In a language using word compounding this would become "snowremovingequipmentrepairinstallations"

Assume further that the word has been misspelled as

"snowremovingequopmentrepairinstallations"

Figure 1:
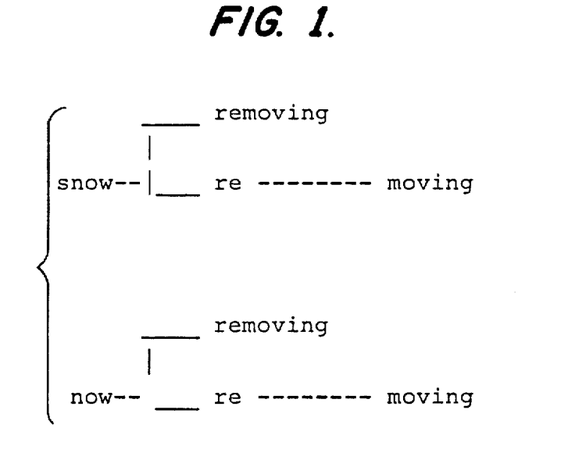
FIG. 1 illustrates an example tree diagram.

Starting from the first and second letters, the trees of FIG. 1 are obtained for the front subword. The front subwords "snow," "snowremoving," "snowre," "snowmoving," "removing," "re," "moving," "now," "nowre," "norwremoving" and "nowmoving" are obtained from these trees.

Figure 2:
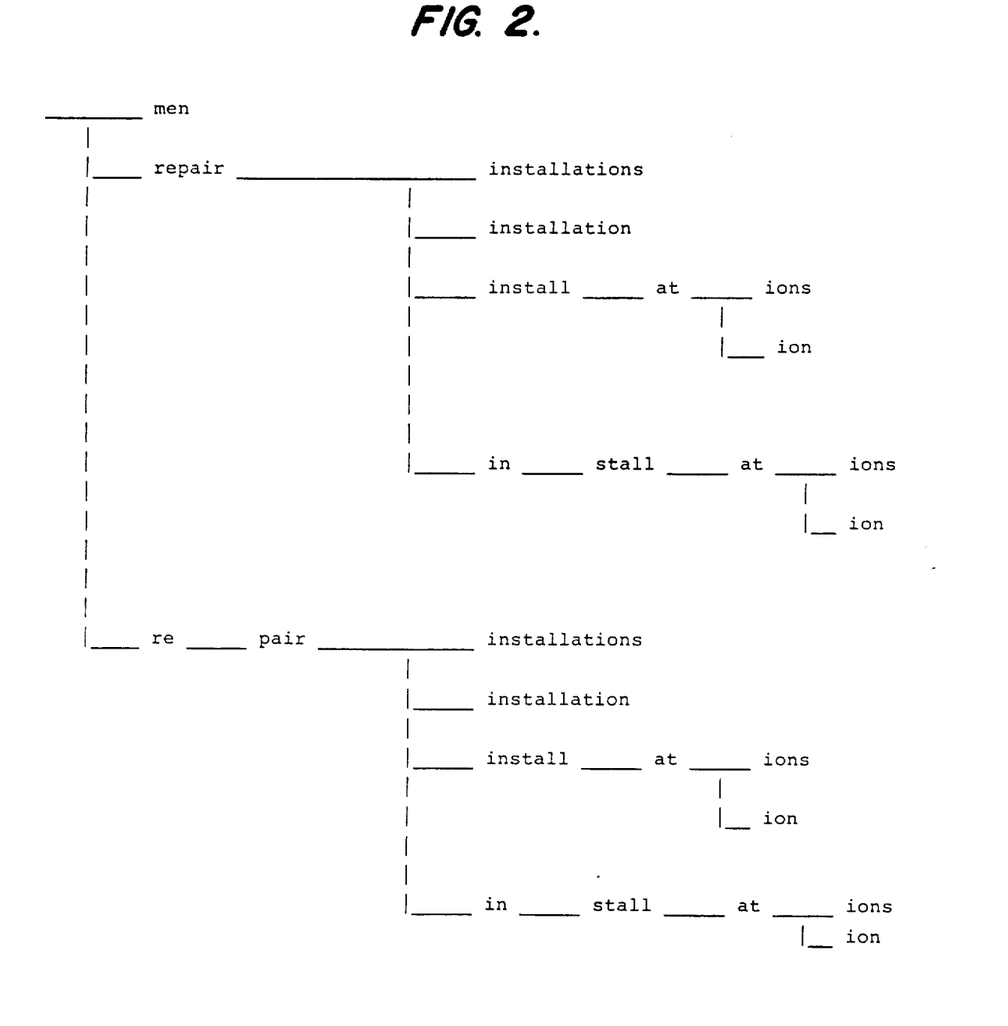
FIG. 2 represents a more complex tree diagram.

For the front subword "snowremoving," possible back substrings are obtained by successive application of the parsing algorithm to the remainder of the originally inputted word, i.e. to the strings "equopmentrepairinstallations," "quopmentrepairinstallations," "uopmentrepairinstallations" etc., obtaining the tree of FIG. 2.

The back subwords "repair," "repairinstallations," "repairinstallation" etc. are obtained from this tree. For the front subword "snowremoving" and the back subword "repairinstallations," the simple word spelling aid algorithm" is run for the substrings "equopment," "quopment," "uopment" . . . , "equopmen," "quopmen," "uopmen" . . . , etc. Thus, among others, the simple word candidates "equipment," "equip," "quip" "meant" are obtained.

Thus for the front subword "snowremoving" and the back subword "repairinstallations," the compound word spelling aid algorithm yields, among others, the candidates

1—"snowremovingequipmentrepairinstallations"
2—"snowremovingequiprepairinstallations"
3—"snowremovingquiprepairinstallations"
4—"snowremovingmeantrepairinstallations"

The process is repeated for the other combinations of front and back substrings. For example, the front substring "snowremoving" and the back substring "repairinstallation" will yield, among others, the compound word spelling aid candidates:

5—"snowremovingequipmentrepairinstallation"
6—"snowremovingequiprepairinstallation"
7—"snowremovingquiprepairinstallation"
8—"snowremovingmeantrepairinstallation"

Using the front substring "nowremoving," candidates #9-16 are obtained:

9—"nowremovingequipmentrepairinstallations"
10—"nowremovingequiprepairinstallations"
11—"nowremovingquiprepairinstallations"
12—"nowremovingmeantrepairinstallations"
13—"nowremovingequipmentrepairinstallation"
14—"nowremovingequiprepairinstallation"
15—"nowremovingquiprepairinstallation"
16—"nowremovingmeantrepairinstallation"

Finally, the candidates are ranked for "goodness of fit." In a first approximation, the candidate #1 is "best" (substitution of one letter) followed by #5 and #9 (substitution of one letter plus suppression of one letter).

The method can be generalized to the case of where also valid substrings are found in the middle of the compound word to be spelling aided. Consider the case where the original word is misspelled as "snowrimuvingequipmentriloirinstallations"

Figure 3:
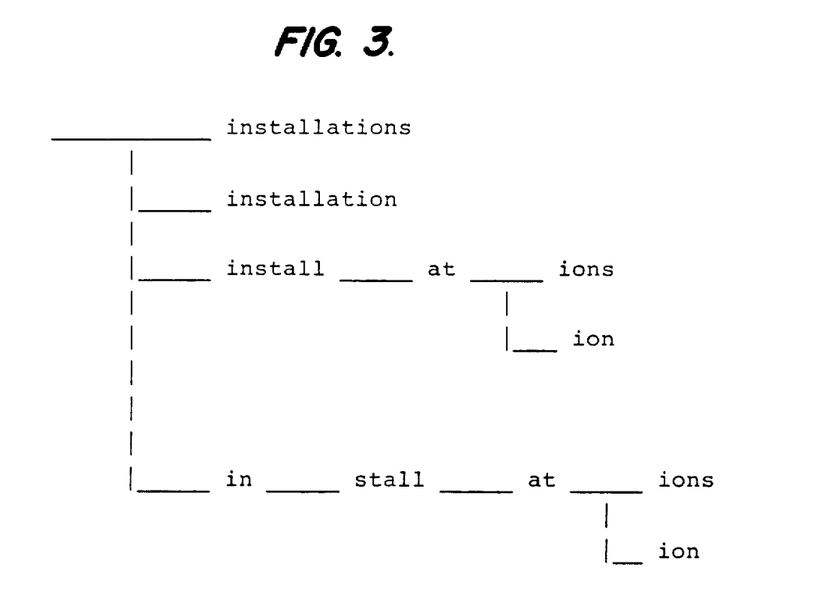
FIG. 3 is a third tree diagram illustration.

In this case, the front substrings obtained are "snow" and "now," the middle components "equipment," "equip," "quip" and "men" and possible end substrings are obtained from the tree of FIG. 3.

Simple word spelling aid is then performed for substrings formed as above between the front substrings found and middle substrings found and also for substrings formed as above between the middle substrings found and the end substrings found. The compound word spelling aid candidates are then formed by proper concatenation and these candidates ranked for "goodness of fit."

A pseudo-code similar to PL/1 is given below in Table 1 for the above basic case. For ease of understanding, the following conditions are embedded in this code:
1. The front subword found must start with the first letter of the compound word to be spelling aided or be the "null" string.
2. The back subword found must terminate either on the last letter or on the previous to last letter of the compound word to be spelling aided, and must be the longest such subword. If a back subword terminating on the last letter is found, no further search for a back subword terminating on the previous to last letter will be made.
3. The simple word to be spelling aided is formed by the substring between the front and the back substring found. If, however, letter insertion can occur at the end of the front subword, (a morphological characteristic of e.g. some Germanic languages) another simple word is formed by prefixing the proper letter to the simple word formed by the substring between the front and back substring found and simple word spelling aid candidates are obtained for this word. If required, this prefix is deleted during the concatenation of the front substring, the simple word spelling aid candidate and the back substring for the formation of the compound word spelling aid candidate.
4. The front subword and the back subword and the words to be spelling aided through simple word spelling aid must contain a fixed minimum number of letters.

The imposition of these conditions on the pseudocode should in no way be considered a limitation on the generality of the invention. Note that in particular condition #4 is absolutely general since the minimum can be set to one.

Figure 4:
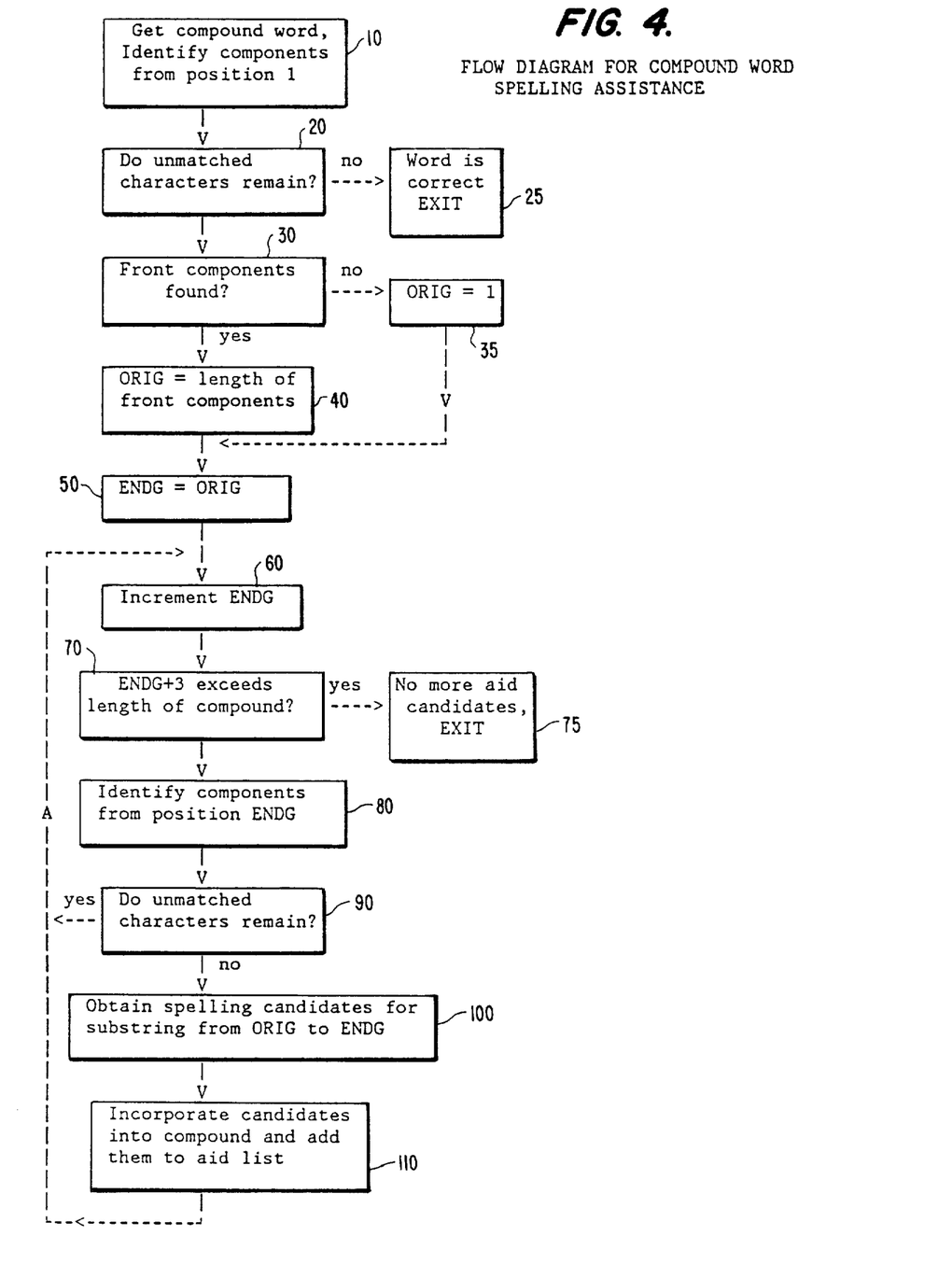
FIG. 4 is a flow diagram for compound word spelling assistance, in accordance with the invention.

The invention is further described with the aid of the flow diagram of FIG. 4. The purpose of the flow diagram is to identify an unknown component in a compound word and provide spelling candidates within the context of the compound word. Stage 10 is the initial step of obtaining the compound word from a stream of text or from a program requesting spelling assistance. At this time all initial components of the compound word are identified by reference to a dictionary. In Stage 20 we check to see if any characters remain unmatched. If the complete compound word matched, it is assumed to be correct and we exit Stage 25. Otherwise, we check to see if any leading components were found (Stage 30). If not, the start of the unknown component is set to 1 in Stage 35. ORIG is a program variable which identifies the beginning of the unknown component. If front components were found, ORIG is set equal to their length (Stage 40). ENDG is a variable which identifies the end of the unknown component. In Stage 50, it is initially set equal to ORIG, but it is then incremented in the subsequent steps until a recognizable ending component is found or until the end of the compound word is reached. Stage 60 increments ENDG to try to find the position of a recognizable ending component. Stage 70 checks to make sure that there are enough characters remaining in the compound word to match against an end component. If not enough characters remain, ENDG is set to point to the end of the string and spelling candidates are constructed as for Stage 110, then we exit Stage 75. Stage 80 is the dictionary lookup where we try to identify any valid ending components starting from the position indicated by ENDG. If we did not match the remaining portion of the compound word completely, we did not find any valid end components (Stage 90) and we go back to Stage 60 to skip another character and try again. Stage 100 is executed when a valid end component is found. At this time we obtain a set of spelling candidates for the unknown component delimited by ORIG and ENDG and we incorporate them into the front and end components (Stage 110) to create a set of compound word spelling candidates. The candidates are constructed by juxtaposing the front component, the candidates, and the ending components. Checks are made for appropriate compounds flags, elisions, and binding characters. The process continues by returning to Stage 60.

Conclusion:

This invention provides a practical method for providing correctly spelled candidates for misspelled compound words. The critical requirements for the search for correctly spelled candidates are:
1. Effective identification of all the words in the misspelled compound word that can be legitimate components of a compound word, taking into account the position if each constituent word within the misspelled compound word.
2. Efficient (i.e., rapid operation, small resource) identification of all legitimate "joints" between the possible legitimate components found within the misspelled compound word and between such a word and an unidentified letter string, taking into account possible letter elisions.
3. Efficient (i.e. rapid operation, small resource) identification of simple word candidates to replace the letter strings between the possible legitimate components found within the misspelled word, taking into account the position of the candidates within the possible correctly spelled compound word candidates.
4. Effective identification of only those constituent word combinations that form a legitimate compound word for presentation as a valid candidate.

This invention provides a practical method for providing these correctly spelled candidates through the use of: a comprehensive constituent word dictionary with a full set of acceptable prefixes and suffixes; a comprehensive set of compound flags for each word in the dictionary; an efficient method for examining the misspelled compound word to find possible legitimate constituent words contained in the misspelled compound word, taking into account the position of the constituent word within the misspelled compound word; an efficient method for examining each simple word candidate for positional validity between the possible components; and an efficient method for examining the compound word candidates to screen out unacceptable word combinations and to effect letter elisions if and when required by the language.

Although a specific embodiment of the invention has been disclosed, it will be understood by those having skill in the art that minor changes can be made to the specific embodiment without departing from the spirit and the scope of the invention.

What is claimed is:

TABLE 1

PSEUDOCODE

FOR

SPELLAID FOR GERMANIC COMPOUND WORDS

VARIABLES
----------

```
DCL AIDWRD CHAR(INTMAX);        /* Word being spellaided             */
DCL INTMAX BIN(15);             /* Max.length of AIDWRD              */
DCL AIDLEN BIN(15);             /* No. of char's of AIDWRD           */
DCL SAVLEN BIN(15);             /* Store AIDLEN                      */

DCL  MXLEV BIN(15); /* max.no. of components in a compound word      */
DCL  MXTAG BIN(15); /* max.no. of candidates per components          */
DCL  MXPRD BIN(15); /* equals MXLEV*MXTAG                            */

/*  summary data from parsing */
DCL 1 PRSDATA,
      3 PRSLENFD   BIN(15), /*  longest length found dur.parsing*/
      3 PRSTABMX   BIN(15), /*  no. of components of the same       */
      3 *(MXLEV),
        5 PRSNUMMX  BIN(15), /*  no. of substrings at this level */
        5 PRSADFMX  BIN(15), /*  additional letter flag           */
        5 PRSPOSMX  BIN(15), /*  pointer to start of component    */
        5 PRSSTMMX  BIN(31), /*  stem# of that substring          */
        5 PRSVARMX  BIN(15), /*  variant# of the same             */
        5 PRSDCTMX  BIN(15), /*  dictionary of the same           */
        5 PRSLENMX  BIN(15); /*  length of the same               */

DCL 1 STRDATA,                  /* store PRSDATA of AIDWRD decomp'g */
      3 STRLENFD   BIN(15),
      3 STRTABMX   BIN(15),
      3 *(MXLEV),
        5 STRNUMMX  BIN(15),
        5 STRADFMX  BIN(15),
        5 STRPOSMX  BIN(15),
        5 STRSTMMX  BIN(31),
        5 STRVARMX  BIN(15),
        5 STRDCTMX  BIN(15),
        5 STRLENMX  BIN(15);

/* detail data from parsing */
DCL 1 PRVALUES,
      3 PRLEN(MXLEV,MXTAG) BIN(15);
```

```
                                 /* length of substring         */
DCL 1 STVALUES,            /* store PRVALUES of AIDWRD decomp'g*/
    3 STLEN(MXLEV,MXTAG) BIN(15);

DCL TB BIN(15);             /* Run variable for level         */
DCL TAG BIN(15);            /* Run variable for "TAG"         */
DCL 1 STPTR,                /* TAG pointers for each level    */
    3 STTAGPTR(MXLEV) BIN(15);

DCL ORG BIN(15);         /* First letter after front substring */
DCL SP BIN(15);          /* First letter of back substring     */

DCL FRNTWRD CHAR(INTMAX);    /* Front substring for forming    */
                             /*   of compound candidate        */
DCL FRNTLEN BIN(15);         /* Length of FRNTWRD              */
DCL SRCHWRD CHAR(INTMAX);    /* Substring for decompounding    */
                             /*   used to find backstring      */
DCL SRCHLEN BIN(15);         /* Length of SRCHWRD              */
DCL BACKWRD CHAR(INTMAX);    /* Back substring for forming     */
                             /*   of compound candidate        */
DCL BACKLEN BIN(15);         /* Length of BACKWRD              */
DCL ADDLETT CHAR(1);         /* Letter inserted at beginning   */
                             /*   of SIMPWRD                   */
DCL SIMPWRD CHAR(INTMAX);    /* Word for which simple word     */
                             /*   spellaid is requested        */
DCL SIMPLEN BIN(15);         /* Length of SIMPWRD              */
DCL SIMPPOS BIN(15);         /* Position of SIMPWRD in         */
                             /*   compound word ( front,       */
                             /*   middle or back component     */
DCL NRCAN BIN(15);           /* No. of candidates found in one */
                             /*   try.                         */
DCL NRALLCND BIN(15);        /* Total no. of compound word     */
                             /*   spellaid candidates found    */
DCL NRCANTOT BIN(15);        /* Total no. of candidates        */
                             /*   selected to be presented     */
                             /*   to the spellaid requester    */
DCL NRCANMAX BIN(15);        /* Maximum number of candidates   */
                             /*   found in all tries to be     */
                             /*   presented                    */
DCL MAXCAN BIN(15);          /* Maximum value of NRCAN         */
DCL SMPADWRD(MAXCAN) CHAR(INTMAX);/* Simple word from simple word */
                             /*   spellaid candidate listund   */
                             /*   to be included in compound   */
                             /*   candidate                    */
DCL SMPADLEN(MAXCAN) BIN(15);   /* Length of CANDWRD()         */
DCL CANDWRD(MAXCAN) CHAR(INTMAX);/* Compound words found which */
                             /*   are spellaid candidates      */
DCL CANDLEN(MAXCAN) BIN(15);    /* Length of CANDWRD()         */
DCL CONTWRD(MAXCAN) CHAR(INTMAX);/* Word to be decompounded for */
                             /*   appending if TAG>1           */
DCL CONTLEN(MAXCAN) BIN(15);    /* Length of CONTWRD()         */
DCL FSTLETT BIN(15);            /* First letter of CONTWRD     */
DCL MINLETTS BIN(15);           /* Minimum number of letters   */
                                /* for which simple word       */
                                /* can be requested            */
```

```
DCL 1 INDCPAID,
     3 INDFRNT(INTMAX) BIN(15),  /* Index showing if the search   */
                                 /*   for candidates with this    */
                                 /*   FRNTWRD was already made.   */
     3 INDBACK(INTMAX) BIN(15);  /* Index showing if the substring*/
                                 /*   starting at this letter has */
                                 /*   been tested for a BACKWRD.  */
DCL INDNONE  BIN(15) CONSTANT(9);/* Tried but none found          */
DCL INDEXACT BIN(15) CONSTANT(1);/* For FRNTWRD: already tried    */
                                 /*   this FRNTWORD               */
                                 /* For BACKWRD: Found BACKWRD    */
                                 /*   starting at this position,  */
                                 /*   incl.last letter of AIDWRD  */
DCL INDSHORT BIN(15) CONSTANT(2);/* For BACKWRD: Found BACKWRD    */
                                 /*   starting at this position,  */
                                 /*   excl.last letter of AIDWRD  */
DCL 1 FLGCPAID BIN(15),          /* Flags for cmompound word aid  */
     3 FLGZERO BIT(1),           /* ON if try for FRNTLEN=0 has   */
                                 /*   already been made           */
     3 FLGSHORT BIT(1);          /* ON if backword without        */
                                 /*   AIDWRD's last letter was    */
                                 /*   already obtained this try   */
     3 FLGADDLT BIT(1);          /* ON if letter inserted at      */
                                 /*   beginning of SIMPWRD        */

DCL I BIN(15);                   /* DO-loop running variable      */

SUMMARY DESCRIPTION OF SUBROUTINES CALLED
     -----------------------------------------

DECOMP:    Analyses a compound word to find its components and/or
           substrings.
SIMPLAID:  Obtains aid candidates for the simple word SMPWORD.
INSERTLT:  Adds front letter to SMPWORD if letter insertion possible
NEWSTR:    Updates STRDATA if FRNTWRD is changed.
POSTCAND:  Posts compound word aid candidates to candidate list.
BESTCAND:  Selects the best compound word candidates for output.
LOWER:     Sets letter(s) to lower case.
UPPER:     Sets letter(s) to upper case.
LETTVOW:   Obtains if letter is vowel or not
CHEXCESS:  Checks a compound word for morphologically forbidden
           conditions at its component interfaces and makes the
           necessary corrections.

CODE
                         ----

/*                Initialize variables                            */
    SAVLEN = AIDLEN;
ALLOVER:
    PRSDATA  = '00'X;
    STRDATA  = '00'X;
    PRVALUES = '00'X;
    STVALUES = '00'X;
```

```
  FOR I=1 TO MXLEV;
     STTAGPTR(I) = 1;
  END;
  INDCPAID = '00'X;
  FLGCPAID = '00'X;
  ADDLETT  = ' 'X;
  FOR I=2 TO AIDLEN;
     CALL LOWER(AIDWRD(I:I));
  END;

/***************************************************************/
/*                                                             */
/*       Start of tries to obtain compound word candidates     */
/*                                                             */
/***************************************************************/

/* Decompound AIDWRD. If the length of the biggest substring found */
/* equals AIDLEN or AIDLEN-1, then this substring is by far the    */
/* best candidate for spellaid. The word is posted to the compound */
/* word candidate list. No further try is made since this is by    */
/* far the best candidate.                                         */
  CALL DECOMP(AIDWRD,AIDLEN);
  IF PRSLENFD >= AIDLEN-1 THEN DO;
    NRCAN = 1;
    CANDLEN(1) = PRSLENFD;
    CANDWRD(1) = AIDWRD(1:PRSLENFD);
    CALL POSTCAND(CANDWRD(),CANDLEN(),NRCAN);
    GOTO SELECT;
  END;

/* If the biggest substring of AIDWRD is less than AIDLEN-1, then   */
/* store PRSDATA and PRVALUE. Set TB to maximum no. of components   */
/* found and TAG to STTAGPTR(STRMAXTB)=1 for first try.             */
  STRDATA = PRSDATA;
  STVALUES = PRVALUES;
  TB   = STRTABMX;
  TAG  = 1;

/* Define the letter at position ORG in AIDWRD which is            */
/* the first letter after the found substring, and then a word     */
/* starting after this letter and containing the rest of AIDWRD .  */
/* Also define the front substring found FRNTWRD and its length    */
/* FRNTLEN. The case TB=0 or PRSLENFD=0 is also considered.        */
/* If FRNTLEN<MINLETTS, set FRNTLEN=0.                             */
'INDCAND:
  FLGCPAID=0;
  IF TB=0 | STRLENFD=0 THEN GOTO FRNTZERO;
  ORG = STRPOS(TB) + STLEN(TB,TAG);
  SP = ORG + 1;
     /* If the candidate search for this initial value of SP has  */
     /* been made, don't try again. If not yet, set INDFRNT(SP)=1. */
  IF INDFRNT(SP)=INDEXACT THEN GOTO NEXTTRY;
  INDFRNT(SP)=INDEXACT;
  FRNTLEN = ORG - 1;
  IF FRNTLEN<MINLETTS THEN GOTO FRNTZERO;
  FRNTWRD = AIDWRD(1:FRNTLEN)
```

```
        GOTO BACKSTRNG;
     /* If FRNTLEN<MINLETTS, set FRNTLEN=0.                        */
FRNTZERO:
   IF FLGZERO=ON THEN GOTO NEXTTRY;
   FLGZERO=ON;
   ORG = 1;
   SP= 2;
   FRNTLEN = 0;
   FRNTWRD = ''X;
     /* If for a given AIDWRD substring starting at the letter SP  */
     /* the attempt for a valid back substring already was made,   */
     /* INDBACK(SP)>0 and no decompounding is needed. If a valid   */
     /* BACKWRD was found, the required BACKWRD is available.      */
     /* Further, if during this try we already obtained a BACKWRD  */
     /* not containing the last letter of AIDWRD, we look for a    */
     /* BACKWRD which contains this letter and thus increment SP   */
BCKSTRNG:
   IF INDBACK(SP)>0 THEN DO;
      IF INDBACK(SP)=INDNONE THEN GOTO INCRSP;
      IF INDBACK(SP)=INDEXACT THEN GOTO EXACT;
      IF INDBACK(SP)=INDSHORT THEN DO;
         IF FLGSHORT=OFF THEN GOTO SHORT;
         GOTO INCRSP;
      END;
   END;
   SRCHWRD = AIDWRD(SP:AIDLEN)
   SRCHLEN = AIDLEN - SP + 1;
/* Now we try to decompound SRCHWRD. If the longest substring found */
/* has length SRCHLEN or SRCHLEN-1, we have found the back portion  */
/* of a candidate. Otherwise, we increment SP+1 until SP equals to  */
/* AIDLEN-MINLETTS+1 in which case the backword is too short to be  */
/* considered and there is no backword.                             */
   CALL DECOMP(SRCHWRD,SRCHLEN);
   IF PRSLENFD < SRCHLEN-1 THEN DO;
      INDBACK(SP) = INDNONE;
INCRSP:
      SP = SP + 1;
      IF SP <= AIDLEN-MINLETTS THEN GOTO BCKSTRNG;
      BACKLEN = 0;
      BACKWRD = ''X;
      SP = AIDLEN + 1;
      GOTO FORMCAND;
   END;
/* Define the backportion of candidates and their length. Set       */
/* INDBACK(SP) to 1 or 2 to avoid repetitive processing.            */
   IF PRSLENFD = SRCHLEN-1 THEN DO;
      INDBACK(SP) = INDSHORT;
SHORT:
      FLGSHORT = ON;
      BACKWRD = AIDWRD(SP:AIDLEN-1);
      BACKLEN = AIDLEN - SP;
      GOTO FORMCAND; .
   END;
   INDBACK(SP) = INDEXACT;
EXACT:
   FLGSHORT = OFF;
   BACKWRD = AIDWRD(SP:AIDLEN);
```

```
  BACKLEN = AIDLEN - SP + 1;
/* If there is neither a front nor a back substring, nothing can  */
/* be done since the whole word should be aided as a simple word. */
/* Try for more candidates.                                       */
FORMCAND:
  If FRNTLEN=0&BACKLEN=0 THEN GOTO NEXTTRY;
/* If we have less than the minimum number of letters MINLETTS    */
/* between the front and the back substrings, we set the number of*/
/* NRCAN=1,concatenate the front and back substrings and post     */
/* this cancidate to the candidate list. ( Note that the subroutine*/
/* POSTCAND also calculates a figure of merit for each candidate  */
/* posted to the list. ) Then try for more candidates.            */
  IF FRNTLEN + BACKLEN > AIDLEN - MINLETTS THEN DO;
    NRCAN = 1;
    CANDLEN(1) = FRNTLEN + BACKLEN;
    CANDWRD(1) = ''X;
    IF FRNTLEN>0 THEN CANDWRD(1)=FRNTWRD;
    IF BACKLEN>0 THEN CANDWRD(1)=FRNTWRD+BACKWRD;
    CALL POSTCAND(CANDWRD(),CANDLEN(),NRCAN);
    GOTO NEXTTRY;
  END;
/* Define the part of AIDWRD between the front substring and the  */
/* back portion, and spellaid as a simple word which will         */
/* give a number NRCAN of reasonable candidates SIMPWRD() with    */
/* length SIMPLEN().                                              */
/* If letter insertion has taken place, the routine SIMPAID       */
/* eliminates any SIMPWRD() with first letter different from      */
/* the first letter of SMPADWRD. ( Note that the letter           */
/* insertion case only occurs if FRNTLEN>=MINLETTS. )             */
  SMPADWRD = AIDWRD(ORG:SP-1);
  CALL UPPER(SMPADWRD(1));
  SMPADLEN = SP - ORG;
AIDSIMPL:
  CALL SIMPLAID(SMPADWRD,SMPADLEN,SIMPPOS,ADDLETT,FLGADDLT);
/* Form the candidates CANDWRD() with length CANDLEN() by         */
/* concatenation of FRNTWRD, SIMPWRD() and BACKWRD, adjusting     */
/* first letter cases, and add these candidates to the candidate  */
/* list. Then make another try for more candidates.               */
  FOR I=1 to NRCAN;
    CANDLEN(I) = FRNTLEN + SIMPLEN + BACKLEN;
    CANDWRD(1) = ''X;
    IF FRNTLEN>0 THEN CANDWRD(I)=FRNTWRD;
    CALL LOWER(SIMPWRD(1));
    IF FRNLEN=0 THEN CANDWRD(I)=SIMPWRD(I);
    IF FRNLEN>0 THEN CANDWRD(I)=CANDWRD(I)+SIMPWRD(I);
    IF BACKLEN>0 THEN CANDWRD(I)=CANDWRD(I)+BACKWRD;
    CALL UPPER(TPINTWRD(1));
  END;
  CALL POSTCAND(CANDWRD(),CANDLEN(),NRCAN);

/****************************************************************/
/*                                                              */
/*      End of try to obtain compound word candidates           */
/*                                                              */
/****************************************************************/
```

```
/****************************************************************/
/*                                                              */
/*    Start of further tries to obtain compound word candidates */
/*                                                              */
/****************************************************************/

NEXTTRY:
/* If the last try was for a backword without AIDWRD's last letter, */
/* try to find candidates with a new BACKWRD which includes this    */
/* letter. Increment SP.                                            */
   IF FLGSHORT=ON THEN GOTO INCRSP;
/* If the last try was for TB=0 no further tries are necessary      */
   IF TB=0 THEN GOTO SELECT;                            */
/* Check for possible letter insertion at the interface of FRNTWRD  */
/* and SMPADWRD. If yes, form new word for simple word spellaid     */
/* and obtain more candidates.                                      */
   IF FLGADDLT=OFF & FRNTLEN>=MINLETTS THEN DO;
     CALL INSERTLT(AIDWRD,AIDLEN);
     IF FLGADDLT=ON THEN DO;
       SMPADWRD(2:SMPADLEN+1) = SMPADWRD(1:SMPADLEN);
       ADDLETT = AIDWRD(FRNTLEN:FRNTLEN);
       SMPADWRD(1:1) = ADDLETT;
       SMPADLEN = SMPADLEN + 1;
       GOTO AIDSIMPL;
     END;
   END;
   ELSE FLGADDLT=OFF;
/* Increment the TAG by 1. If the new TAG is larger than the        */
/* tag no. of components found for this level, goto the previous    */
/* level. Note that in this section TAG>1.                          */
   TAG = TAG + 1;
   STTAGPTR(TB) = TAG;
   IF TAG>STRNUMMX(TB) THEN GOTO TBMINONE;
/* Now form a word which starts with the first letter after the     */
/* component defined by TB and the new TAG and covers the rest of   */
/* AIDWRD and try to decompound this word.                          */
   FSTLETT = STRPOS(TB) + STRLEN(TB,TAG);
   CONTWRD = AIDLEN(FSTLETT:AIDLEN);
   CONTLEN = AIDLEN - FSTLETT + 1;
   CALL DECOMP(CONTWRD,CONTLEN);
/* If no component has been found for CONTWRD, a new FRNTWRD and    */
/* FRNTLEN is defined and we can start another try. If CONTWRD has  */
/* valid components, form new STRDATA and STVALUES representing     */
/* the appending of these components and start another try. Note    */
/* that the value STRTABMX is redefined by NEWSTR.                  */
   IF PRSLENFD=0 THEN GOTO FINDCAND;
   CALL NEWSTR(STRDATA,STVALUES,PRSDATA,PRVALUES);
   TB = STRTABMX;
   TAG = 1;
   GOTO FINDCAND;
/* If no more TABs are available at a level, run further tries      */
/* for front substrings terminating at the previous level.          */
TBMINONE:
   TB= TB - 1;
   TAG = 1;
   STRTABMX = TB;
   GOTO FINDCAND;
```

```
/*********************************************************/
/*                                                       */
/*    End of further tries to obtain compound word candidates   */
/*                                                       */
/*********************************************************/

/*********************************************************/
/*                                                       */
/*  Select the candidates with best figure of merit from the list  */
/*  Then check these best candidates for morphologically improper  */
/*  conditions at component interfaces and correct these conditions */
/*                                                       */
/*********************************************************/

SELECT:
  IF NRALLCND>0 THEN DO;
    CALL BESTCAND( Candidate list ,NRCANMAX);
    DO FOR I=1 TO NRCANTOT;
      CALL CHEXCESS( each candidate );
    END;
  END;

/*********************************************************/
/*                                                       */
/*  If no candidate has been found at all, check beginning of  */
/*  AIDWORD for double consonant and if this exists, delete its  */
/*  first letter and try again. Do not iterate this process.     */
/*                                                       */
/*********************************************************/

IF (AIDLEN=SAVLEN) & (AIDWRD(1:1)=AIDWRD(2:2))
        & (LETTVOW(AIDWRD(1:1))=OFF) & (NRCANTOT=0) THEN DO;
      AIDWRD(1:AIDLEN-1) = AIDWRD(2:AIDLEN);
      AIDLEN = AIDLEN - 1;
      GOTO ALLOVER;
    END;

/*********************************************************/
/*********************************************************/
/*                                                       */
/*                End of pseudocode                      */
/*                                                       */
/*********************************************************/
/*********************************************************/
```

1. In a computer system including input and output devices and a dictionary of terms each of which has a code indicating the way in which the term may be associated to form compound words, a process for isolating the unknown components of an input compound word which is misspelled or for which the dictionary of terms does not contain all of its components, comprising:
  identifying all dictionary terms which have a code indicating that they can be initial substrings of compound words and which are initial substrings of said input compound word;
  for each said initial substring, identifying in turn the remaining substring of the input compound word by retaining the portion of the compound word succeeding the initial substring;
  identifying the unknown components of the input compound word to be the set of said remaining substrings truncated at a point where any terminal substring starts.

2. In the process of claim 1, an additional process for generating compound word spelling assistance candidates, comprising:
  for each said unknown component, identifying all dictionary terms that have a code compatible with the way in which the said unknown component is associated with the other components of the input compound word and identifying these dictionary terms as suitable replacements for the unknown component;

producing a list of spelling assistance candidates for the input compound word by replacing, in turn each unknown component within the said input compound word with a corresponding suitable replacement; displaying said list of spelling assistance candidates on an output device of the computer system.

3. In the process of claim 2, an additional process for generating compound word spelling assistance candidates, comprising:

ranking the list of spelling assistance candidates on the basis of morphological or phonetic similarity to the input compound word prior to display of the said list on an output device of the computer system.

4. A computer method for identifying an unknown component in a compound word and providing spelling candidates within the context of the compound word, comprising the steps of:

inputting to a computer a compound word from a stream of text;

matching front components of the input compound word to entries in a dictionary data base;

terminating the analysis if the complete compound word is matched with an entry in said dictionary;

identifying a leading component of said compound word as an unknown component if said leading component thereof was not matched with entries in said dictionary;

matching successive groups of contiguous characters in said compound word with entries in said dictionary until an ending component is successfully matched with the entries in said dictionary;

generating a plurality of alternate compound word candidates by combining front component entries from said dictionary which are similar to said front component of said input compound word, with end component entries from said dictionary which are similar to said end component of said input compound word;

checking each of said plurality of compound word candidates for appropriate compound flags, elision codes, and binding characters stored in said dictionary in conjunction with said component word entries therein;

displaying a subplurality of said plurality of compound word candidates as appropriate compound words.

* * * * *